(12) United States Patent
Yu et al.

(10) Patent No.: US 9,552,017 B2
(45) Date of Patent: Jan. 24, 2017

(54) ELECTRONIC DEVICE

(71) Applicants: BEIJING LENOVO SOFTWARE LTD., Beijing (CN); LENOVO (BEIJING) LIMITED, Beijing (CN)

(72) Inventors: Fei Yu, Beijing (CN); Jun Zhang, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 131 days.

(21) Appl. No.: 14/499,912

(22) Filed: Sep. 29, 2014

(65) Prior Publication Data
US 2015/0257291 A1 Sep. 10, 2015

(30) Foreign Application Priority Data

Mar. 10, 2014 (CN) .......................... 2014 1 0086027
Mar. 17, 2014 (CN) .......................... 2014 1 0098893

(51) Int. Cl.
*G06F 1/16* (2006.01)
*F16M 11/00* (2006.01)

(52) U.S. Cl.
CPC ............ *G06F 1/1637* (2013.01); *F16M 11/00* (2013.01); *G06F 1/1613* (2013.01); *G06F 2200/1631* (2013.01)

(58) Field of Classification Search
CPC .... G06F 1/1626; G06F 1/1633; G06F 1/1637; G06F 1/1643; G06F 1/1656; G06F 2200/1631; F16M 11/00; H05K 3/321; H05K 5/0234
USPC .......................... 361/679.27, 679.28, 679.26, 679.22,361/679.21, 679.09, 679.02, 679.01; 248/917–924
See application file for complete search history.

(56) References Cited

U.S. PATENT DOCUMENTS

| 7,787,242 B2* | 8/2010 | Schwager | ............... G06F 1/162 361/679.06 |
| 2007/0091553 A1* | 4/2007 | Chang | ................... G06F 1/1618 361/679.27 |
| 2009/0244820 A1* | 10/2009 | Kusaka | ................. G06F 1/1616 361/679.1 |

* cited by examiner

*Primary Examiner* — Anthony Haughton
*Assistant Examiner* — Ingrid Wright
(74) *Attorney, Agent, or Firm* — Scully Scott Murphy & Presser

(57) ABSTRACT

An electronic device is provided. The electronic device has a functional body and a supporting apparatus. The supporting apparatus supports the functional body on a supporting surface. The supporting apparatus has a supporting rod, which is connected to the functional body, and a base. When the electronic device is in a first usage mode, the functional body is approximately perpendicular to the supporting surface. When the electronic device is in a second usage mode, the functional body is approximately parallel to the supporting surface. When the electronic device is switched between the first usage mode and the second usage mode, a relative position of the supporting rod and the base is unchanged.

26 Claims, 6 Drawing Sheets

ELECTRONIC DEVICE

CROSS-REFERENCE TO RELATED APPLICATION(S)

This application claims priority to Chinese Application No. 201410086027.7 filed on Mar. 10, 2014 and No. 201410098893.8 filed on Mar. 17, 2014, which are incorporated herein by reference in their entirety.

BACKGROUND

Technical Field

The present disclosure relates to an electronic field, and in particular, to an electronic device.

Related Art

With the development of science technology and progress of society, electronic devices such as computer, mobile phone, television etc. have become an indispensable part of people's life and work.

The forms of the electronic device such as the computer etc. have been changed dramatically, for example, from desktop to laptop till a tablet computer occurring in the last few years which combines a host and a screen. However, till now, the commonly-used tablet computer generally only has a desktop mode, i.e., the tablet computer is placed horizontally, and is used by individuals or many persons together for information interaction and sharing.

It is found that the current tablet computer only has the desktop mode. Correspondingly, it is applied in a relatively single scenario, and its usage is inconvenient. Therefore, it is difficult to meet increasing multi-function requirements in life.

Further, in order to ensure that the electronic device may be stably placed on a supporting surface, the electronic device is generally arranged with a supporting base. Taking the current television as an example, the current television generally includes a base and a display body rotationally fixed on the base. When the current television is in use, the base is placed on a supporting surface such as a desktop, and then the display body may be supported on the supporting surface. A user may adjust an angle between the display body and the base as needed.

In order to reduce space occupied by the base, a supporting area of the base is generally smaller. When the display body is rotated with a larger angle with respect to the base or is subjected to vibration or an external force, the electronic device is prone to shake or even fall down, thereby being damaged.

SUMMARY

The present disclosure provides an electronic device. The electronic device comprises: a functional body, a supporting apparatus supporting the functional body on a supporting surface and comprising a connected supporting rod and a base; in the case that the electronic device is in a first usage mode, the functional body is approximately perpendicular to the supporting surface; in the case that the electronic device is in a second usage mode, the functional body is approximately parallel to the supporting surface; and when the electronic device is switched between the first usage mode and the second usage mode, a relative position of the supporting rod and the base is unchanged.

In the case that the supporting apparatus is in a first supporting mode, the supporting apparatus forms a first supporting area; and in a case that the supporting apparatus is in a second supporting mode, the supporting apparatus forms a second supporting area being larger than the first supporting area.

BRIEF DESCRIPTION OF THE DRAWINGS

In order to illustrate technical solutions in the embodiments of the present disclosure more clearly, accompanying drawings needed to be used in the description of the embodiments will be described below in brief. Obviously, the accompanying drawings described below are merely some embodiments of the present disclosure. A person having ordinary skill in the art can further obtain other accompanying drawings according to these accompanying drawing without contributing any creative labor.

DETAILED DESCRIPTION OF THE EMBODIMENTS

In order to make the purpose, technical solutions and effects of the present disclosure much clear, embodiments of the present disclosure will be further described in detail below in conjunction with accompanying drawings.

Figure 1:
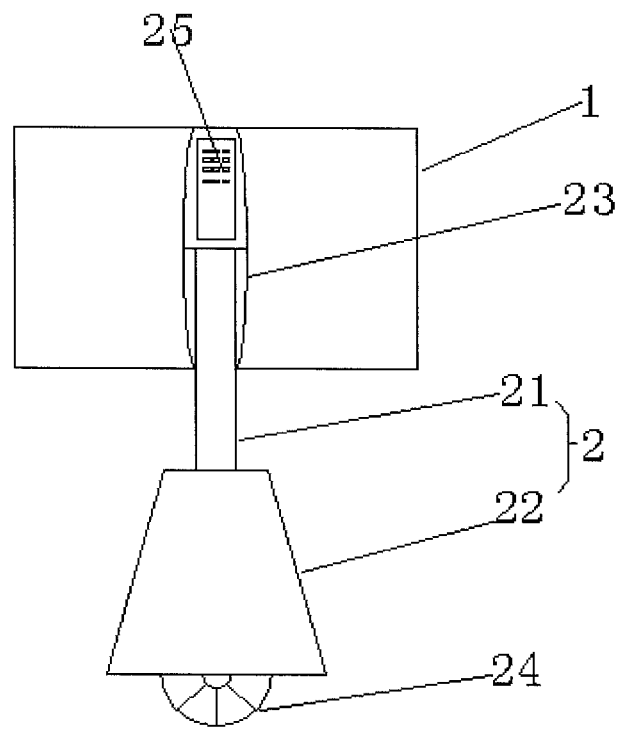
FIG. 1 is a rear view when a functional body of an electronic device is in a vertical state according to an embodiment of the present application.
Figure 2:
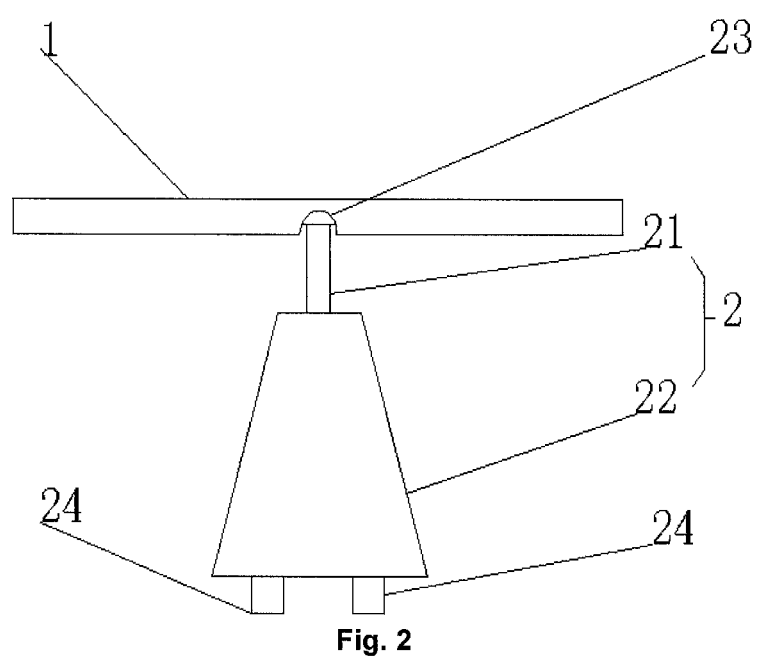
FIG. 2 is a side view when a functional body of an electronic device is in a horizontal state according to an embodiment of the present application.

As shown in FIG. 1 or with reference to FIG. 2, the embodiment of the present disclosure provides an electronic device, including: a functional body 1, a supporting apparatus 2 rotationally connected to the functional body 1; the supporting apparatus 2 supporting the functional body 1 on a supporting surface and including a connected supporting rod 21 and a base 22, wherein the electronic device includes at least a first usage mode and a second usage mode different from the first usage mode; in the case that the electronic device is in the first usage mode, the functional body is approximately perpendicular to the supporting surface; in the case that the electronic device is in the second usage mode, the functional body 1 is approximately parallel to the supporting surface; and when the electronic device is switched between the first usage mode and the second usage mode, a relative position of the supporting rod 21 and the base 22 is unchanged, i.e., an angle therebetween is unchanged.

An upper end of the supporting rod 21 supports the functional body 1, so that the functional body 1 is located on the supporting surface. The supporting surface is generally considered as a horizontal plane. A lower end of the supporting rod 21 is connected to the base 22 to form a stable bottom support. A display screen of the electronic device is generally arranged on the functional body 1. When the electronic device is in the first usage mode, the display screen of the functional body 1 is controlled to be in a first display mode. At this time, both the display screen and the functional body 1 are in a state of being perpendicular to the horizontal plane, i.e., a vertical state. The first display mode is adapted for a first interaction mode. For example, the display screen may be used as a television etc., to be directly viewed by the user from one side. In the case that the electronic device is in the second usage mode, the display screen of the functional body 1 is controlled to be in a second display mode. At this time, both the display screen and the functional body 1 are in a state of being parallel to a horizontal plane, i.e., a horizontal state. The second display mode is adapted for a second interaction mode. The second interaction mode is a multi-person multi-direction interaction mode, i.e., multiple users may overlook the functional body 1 from various directions over the functional body 1. In this way, individual or multi-person information interaction may be achieved, which is simple to operate and convenient to use, and the angle of the functional body 1 may also be adjusted randomly as needed. Thereby, the present disclosure is applicable to various different scenarios to meet the increasing multi-function requirements. In addition, the structure as proposed in the present disclosure is simple, practical and low cost, and has stronger practicability in the market.

With the embodiments of the present disclosure, the supporting apparatus 2 is rotationally connected to the functional body 1, so that the functional body 1 is enabled to be randomly switched between the two usage modes of being approximately perpendicular to the supporting surface and being approximately parallel to the supporting surface. In the case that the functional body 1 is in the horizontal state, it may be used by individuals or many persons for information interaction. In the case that the functional body 1 is in the vertical state, it may be used as a television etc., or the angle of the functional body 1 may also be randomly adjusted as needed, enabling the present disclosure to be applicable to various different scenarios, so as to meet the increasing multi-function requirements of the users.

Specifically in an example, as shown in FIG. 1 or with reference to FIG. 2, the electronic device according to the embodiment of the present disclosure is a desktop computer. The desktop computer includes a display screen arranged on the functional body 1 and the supporting apparatus 2 placed vertically. A central position on the back of the display screen is flexibly connected to a top end of the supporting apparatus 2, and the display screen may be rotated in a range of 180° in a vertical plane with the top end of the supporting apparatus 2 as a center of circle.

According to practical requirements, the display screen may be an interactive screen, such as a touch tablet computer, or a simple television screen. The display screen may be rotated randomly in the range of 180° under the support of the supporting apparatus 2. The central position on the back of the display screen arranged on the functional body 1 is flexibly connected to the top end of the supporting apparatus 2, so as to ensure that in the case that the display screen is in any state in the process of rotation, its center of gravity is within a stable support range of the supporting apparatus 2, thereby ensuring the stability of the display screen during rotation. In the case that the display screen is in the horizontal state, i.e., the display screen is in the second usage mode, it may be used by individuals or many persons for information interaction. For example, many persons interact information together or play a game cooperatively and the like. In the case that the display screen is in the vertical state, i.e., the display screen is in the first usage mode, it may be used as a television etc., and is convenient to be placed in a living room, a bedroom or a study room, or its angle may be adjusted randomly as needed, enabling the present disclosure to be applicable to multiple different scenarios, so as to meet the increasing multi-function requirements. It can be understood that according to the embodiment of the present application, a supporting point of the supporting apparatus 2 with respect to the functional body 1 is always located at a connecting point between the supporting apparatus 2 and the functional body 1, regardless of the usage mode of the electronic device.

Specifically, as shown in FIG. 1 or with reference to FIG. 2, the supporting rod may be a lifting rod 21. The base 22 is sleeve-jointed outside the lifting rod 21, the lifting rod 21 may be in an up and down lifting motion, and the top of the lifting rod 21 is connected to the functional body, i.e., the central position on the back of the display screen in the present embodiment.

The lifting rod 21 may drive the display screen to lift up and down, enabling the height of the display screen to be randomly adjusted according to practical requirements, so as to be applicable to requirements of various different environments. Those skilled in the art can recognize that there are many ways to achieve the lifting effect of the lifting rod 21. For example, a lifting driver such as an electric motor may be installed in the base 22, or a telescopic rod may also be directly used as the lifting rod 21 and the like. The entire design is a separate architecture design. According to patricidal requirements, a large capacity hard disk, a long-term battery, a high quality speaker etc. are placed in the base 22, to enable the entire product to be used both as a family multimedia entertainment center and as a family cloud center. Other devices at home may be synchronized, backed up with the product, or read related data from the product etc. in a wireless or wired manner. Some devices such as a computer case, batteries etc. may also be placed within the base 22, and are connected to the display screen by means of electric lines through the lifting rod 21, so as to achieve the multi-functionality of the present disclosure.

In the present embodiment, a distance by which the lifting rod 21 lifts up is no less than a distance between a connection position and an edge of the functional body. When the functional body is switched between the first usage mode and the second usage mode, if the distance by which the lifting rod 21 lifts up is not enough, it will results in interference between the edge of the functional body and the base 22. Therefore, the distance by which the lifting rod 21 can lift up needs to be no less than the distance between the connection position of the functional body connected to the lifting rod 21 and the edge, so as to avoid the interference.

In the present embodiment, in the case that the functional body is in the second usage mode, the lifting rod 21 is contained in the base 22 and an upper surface of the base 22 contacts with a lower surface of the functional body, thereby a contact area being increased so that the support is more stable in the second usage mode.

An area of the upper surface of the base 22 is generally larger than an area of the top end of the lifting rod 21. In a scenario where there are high requirements on the stability of the functional body, the lifting rod 21 may be lifted down as much as possible, until it is completely contained in the base 22. At this time, the upper surface of the base 22 may contact with the lower surface of the functional body, so that the contact area therebetween is maximized, and thereby the supporting for the functional body is more stable.

Further, as shown in FIG. 1, the top of the lifting rod 21 is connected to the central position on the back of the functional body in a shaft connection.

Specifically, as shown in FIG. 1, in the present embodiment, the functional body 1 may be a display screen, an elongated slot 23 is arranged on the back of the display screen and is parallel to a width direction of the display screen, and the central position on the back of the display screen is located in the elongated slot 23, so that in the case that the electronic device is in the first usage mode, the lifting rod 21 is fastened with the elongated slot 23.

The elongated slot 23 is arranged so that the lifting rod 21 is connected to both sides of an inner wall of the elongated slot 23 through a rotation shaft. In the case that the display screen is in the vertical state, a rod part of the lifting rod 21 is exactly fastened with the elongated slot 23, not only enabling the rod part of the lifting rod 21 to be hidden in the elongated slot 23, presenting a better appearance, but also enabling the lifting rod 21 to support and fix the display screen more stably. Of source, those skilled in the art can recognize that the direction of the elongated slot 23 may not be parallel to the width direction of the display screen, may be parallel to a length direction of the display screen, or may even be flexibly arranged according to practical requirements.

As shown in FIG. 1, a size of the display screen is 32-40 inches. This size is specifically set according to a length of an ordinary person's arms, and is preferable in daily's life. With this size, a user can operate the entire display screen comfortably and conveniently. At the same time, the size is also suitable for use in a large scenario in a home environment. Of course, a different size of the display screen may also be set flexibly according to practical requirements.

Figure 3:
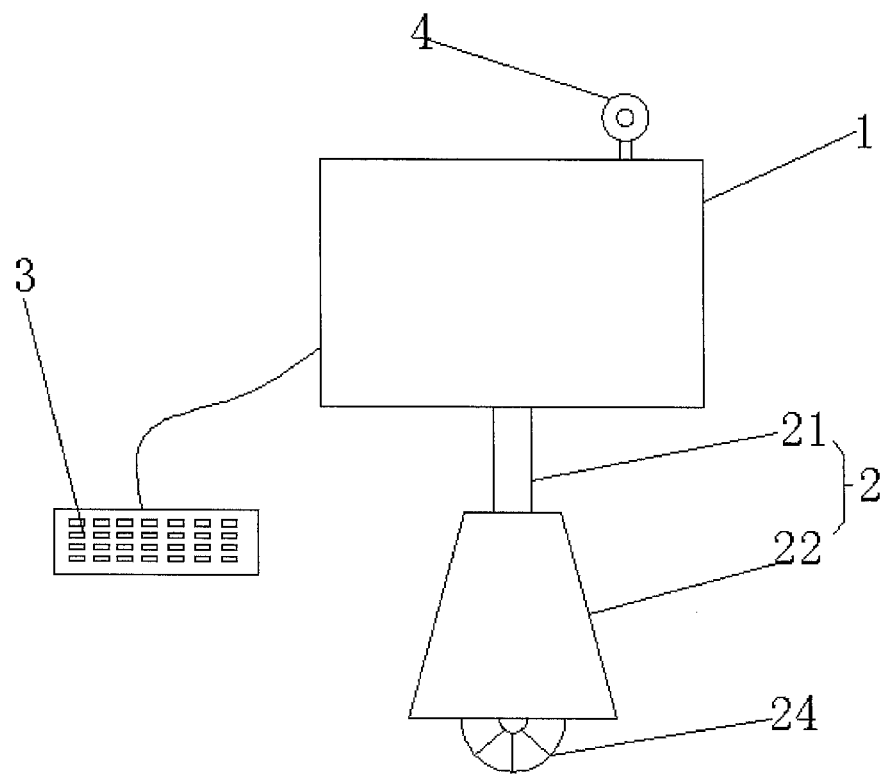
FIG. 3 is a structural diagram of an electronic device according to an embodiment of the present application.

As shown in FIG. 3, the electronic device may further include a keyboard 3 connected to the functional body 1, i.e., the display screen. Information is input into the display screen through the keyboard 3. In the case that the display screen is in the vertical state, it may be used as a television or a stereoscopic game machine for use by the user. The keyboard 3 may also be connected as appropriate according to practical requirements, which is easy to operate. The keyboard 3 may be a wired or wireless keyboard.

As shown in FIG. 1, the desktop computer may further include a remote controller 25 which is placed in the elongated slot 23. The remote controller 25 is used to remotely control the display screen and the supporting apparatus 2. By setting, the remote controller 25 may remotely control the display screen to rotate at any angle, or may also remotely control the lifting rod 21 in the supporting apparatus 2 to lift up and down randomly, thereby adjusting the height of the display screen. When the remote controller 25 is not in use, it may be placed in the elongated slot 23 on the back of the display screen, which is convenient and applicable.

Further, the remote controller 25 is magnetically connected to the elongated slot 23. Of course, the skilled in the art can recognize that the remote controller 25 may also be fixed to the elongated slot 23 in other manners, for example, the remote controller 25 may also be fixed to the elongated slot 23 by a fastener, by being inserted into the slot and the like. The magnetic connection is convenient, and has a simple and beautiful structure.

Further, as shown in FIG. 1 or with reference to FIG. 2, the supporting apparatus 2 further includes a moving part. The moving part is fixedly connected to the supporting apparatus 2 and is used to drive the electronic device to rotate and move on the supporting surface in the case that the electronic device is in either of the first usage mode and the second usage mode.

The moving part is a universal wheel 24. The universal wheel 24 is arranged on the bottom of the base 22 and is used to drive the electronic device to move and/or rotate on the supporting surface under an external force. Multiple universal wheels 24 may be set according to practical requirements. Through the rotation of the universal wheel 24, not only a function of the electronic device flexibly moving to various different position scenarios may be implemented while an overall stable support for the electronic device is achieved, but also the electronic device can be rotated randomly in a range of 360° in the horizontal plane, which has a beneficial effect in practical applications. The remote controller 25 may also control the rotation of the universal wheel 24.

As shown in FIG. 3, the electronic device further includes an adaptive apparatus 4. The adaptive apparatus 4 is arranged on the display screen and is used by the electronic device to collect and process external information. The adaptive apparatus 4 is an apparatus for enabling the electronic device to automatically adapt to the ambient environment, thereby implementing intelligentization to some extent. For example, the electronic device automatically adjusts the angle of the functional body according to the external information, and controls and adjusts its pitch angle; or may automatically adjust parameters such as brightness etc. of the functional body; or may automatically move with the user and the like. Those skilled in the art can recognize that for example a camera is installed on the display screen, enabling the electronic device to automatically capture ambient image information and take an action through internal analysis and process, for example, automatically adjusting the pitch angle of the functional body, adjusting parameters such as brightness etc. of the functional body, instructing the universal wheel 24 to move etc. Alternatively, an infrared sensing apparatus etc. may be installed to implement this function. Alternatively, a wireless connection apparatus may be arranged in the base 22 to implement wireless connection with other external facilities, so that the electronic device becomes a media center for further intelligent automation. Of course, a different intelligent apparatus may also be installed by those skilled in the art according to practical conditions, to make the present disclosure more convenient and applicable.

Further, in order to solve the technical problem with the conventional solution that due to the smaller supporting area of the base, in the case that the functional body is rotated with the larger angle with respect to the base or is subjected to vibration or an external force, the electronic device is prone to shake or even fall down, thereby being damaged, another embodiment of the present application provides an electronic device including a functional body and a supporting apparatus connected to the functional body, the supporting apparatus supporting the functional body on a supporting surface and including at least a first supporting mode and a second supporting mode; wherein in the case that the supporting apparatus is in the first supporting mode, the supporting apparatus forms a first supporting area; and in the case that the supporting apparatus is in the second supporting mode, the supporting apparatus forms a second supporting area larger than the first supporting area.

The first supporting area formed in the case that the supporting apparatus in the electronic device for supporting the functional body on the supporting surface is in the first supporting mode is smaller than a second supporting area in the case that the supporting apparatus is in the second supporting mode. Therefore, the supporting area of the supporting apparatus may vary in the case of being in different supporting modes, and thus the supporting mode of the supporting apparatus may be adjusted according to the state of the electronic device, so that the supporting area of the supporting apparatus varies to stably support the electronic device. This solves the technical problem with the conventional solution that due to the smaller supporting area of the base, in the case that the functional body is rotated with the larger angle with respect to the base or is subjected to vibration or the external force, the electronic device is prone to shake or even fall down, thereby being damaged.

For better understanding the above technical solutions, the technical solutions of the embodiment will be described in detail below with reference to FIGS. 4-8.

Figure 4:
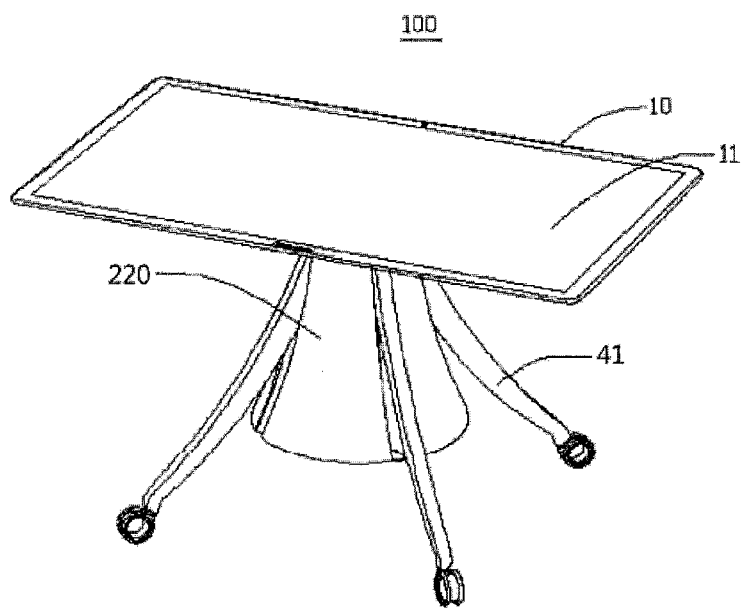
FIG. 4 is a structural diagram of an electronic device according to another embodiment of the present application.

FIG. 4 is a structural diagram of an electronic device 100 according to an embodiment of the present application. As shown in FIG. 4, the electronic device 100 includes a functional body 10 and a supporting apparatus 20.

The functional body 10 may be a body having a display unit, in which electronic elements etc. may also be arranged.

Figure 5:
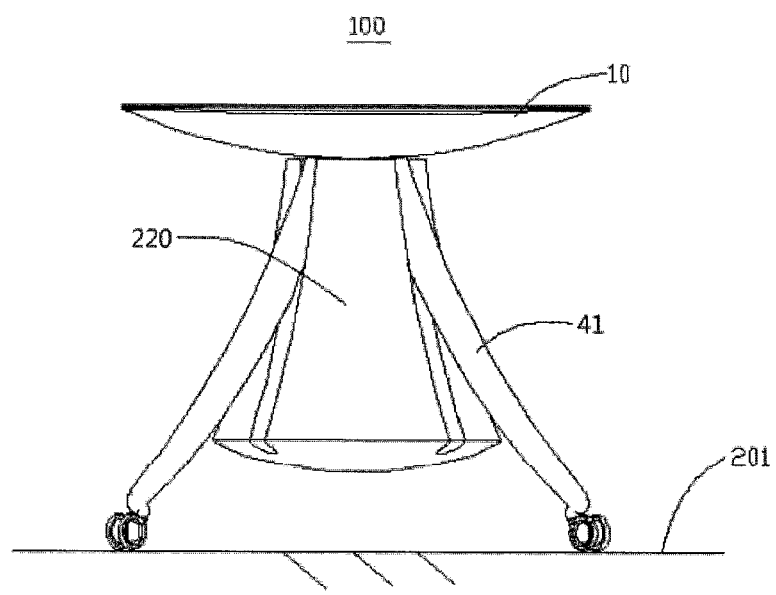
FIG. 5 is a front view when the functional body of the electronic device is in a horizontal state in FIG. 4.
Figure 6:
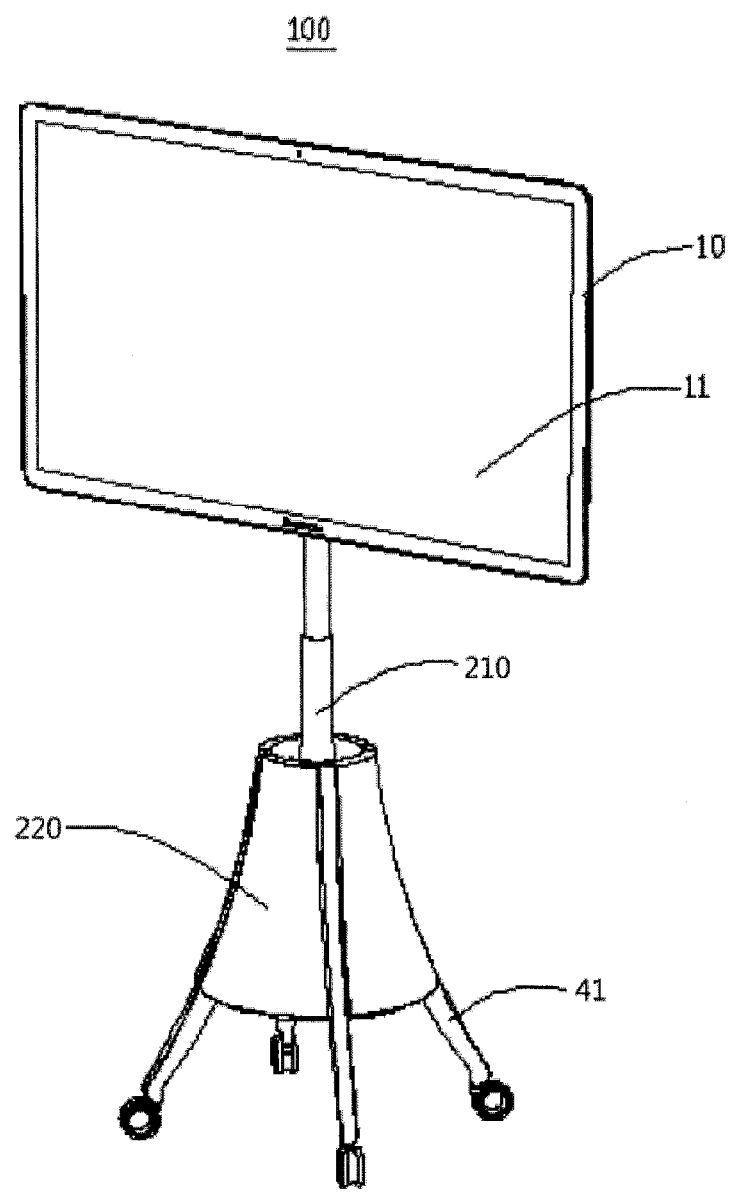
FIG. 6 is a side view when the functional body of the electronic device is in a horizontal state in FIG. 4.

Also with reference to FIGS. 5 and 6, the supporting apparatus 20 is connected to the functional body 10 and is used to support the functional body 10 on a supporting surface 201 (such as a desktop). The supporting apparatus 20 includes at least a first supporting mode and a second supporting mode. That is, the supporting apparatus 20 can support the functional body 10 in at least two supporting modes. In the present embodiment, the first supporting mode and the second supporting mode of the supporting apparatus 20 are taken as an example. In other embodiments, the supporting apparatus 20 may also have multiple supporting modes instead of being limited to the above two supporting modes only.

In the case that the supporting apparatus 20 is in the first supporting mode, the supporting apparatus 20 forms a first supporting area; and in the case that the supporting apparatus 20 is in the second supporting mode, the supporting apparatus 20 forms a second supporting area larger than the first supporting area. That is, the supporting apparatus 20 may have different supporting areas in different supporting modes.

Specifically, the variation of the supporting area of the supporting apparatus 20 may be implemented in at least the following manners.

In a first manner, the supporting apparatus 20 specifically includes multiple supporting legs 41, which are used to support the functional body 10 on the supporting surface 201. In the case that the supporting apparatus 20 is in the first supporting mode, the first supporting area is enclosed by the multiple supporting legs 41; and in the case that the supporting apparatus 20 is in the second supporting mode, the second supporting area is enclosed by the multiple supporting legs 41.

Relative positions among the multiple supporting legs 41 may be changed. For example, the multiple supporting legs 41 may rotate with respect to each other. After the relative positions among the multiple supporting legs 41 are changed, the supporting area of the supporting apparatus 20 may be changed.

In a second manner, an accommodation slot is arranged in the supporting apparatus 20, and is used to accommodate gas or fluid. An elastic pocket is arranged on an end face on which the supporting apparatus 20 contacts with the supporting surface 201, and a valve is arranged between the accommodation slot and the elastic pocket. In the case that the supporting apparatus 20 is in the first supporting mode, the valve is closed, and the fluid or gas is in the accommodation slot; and in the case that the supporting apparatus 20 needs to be switched to the second supporting mode, the valve is opened, the fluid or gas is controlled to flow out from the accommodation slot and flow into the elastic pocket, and then the valve is closed. Under the action of the fluid or gas, the elastic pocket enlarges, so that a contact area between the supporting apparatus 20 and the supporting area 201 increases and thus the supporting area of the supporting apparatus 20 is changed.

The first supporting area formed in the case that the supporting apparatus 20 in the electronic device 100 for supporting the functional body 10 on the supporting surface 201 is in the first supporting mode is smaller than the second supporting area in the case that the supporting apparatus 20 is in the second supporting mode. Therefore, the supporting area of the supporting apparatus 20 may be varied in the case of being in different supporting modes, and thus the supporting mode of the supporting apparatus 20 may be adjusted according to the state of the electronic device 100, so that the supporting area of the supporting apparatus 20 is varied to stably support the electronic device 100. This solves the technical problem with the conventional solution that due to the smaller supporting area of the base, in the case that the functional body is rotated with the larger angle with respect to the base or is subjected to vibration or an external force, the electronic device is prone to shake or even fall down, thereby being damaged.

Further, the electronic device 100 includes at least a first usage mode and a second usage mode different from the first usage mode. In the case that the electronic device 100 is in the first usage mode, the functional body 10 is approximately perpendicular to the supporting surface 201; and in the case that the electronic device 100 is in the second usage mode, the functional body 10 is approximately parallel to the supporting surface 201.

Due to tolerance and error in manufacture and assembly, it is difficult to enable the functional body 10 to be absolutely parallel or perpendicular to the supporting surface 201. Therefore, the functional body 10 is approximately parallel or perpendicular to the supporting surface 201 here, with an angle difference between about −5° and 5°. That is, in the present application, if the angle of the functional body 10 with respect to a direction perpendicular to the supporting surface 201 is between −5° and 5°, the functional body 10 is considered to be in the first usage mode; and if the angle of the functional body 10 with respect to a direction parallel to the supporting surface 201 is between −5° and 5°, the functional body 10 is considered to be in the second usage mode.

In addition, the electronic device 100 includes at least the first usage mode and the second usage mode different from the first usage mode. That is, the electronic device 100 can be used in at least the two usage modes. In the present embodiment, only the first usage mode and the second usage mode of the electronic device 100 are taken as an example. In other embodiments, the electronic device 100 may also have multiple usage modes instead of being limited to the above two usage modes only.

Specifically, the functional body 10 includes a display screen 11. In the case that the electronic device 100 is in the first usage mode, the display screen of the functional body 10 is controlled to be in a first display mode. The first display mode is adapted for a first interaction mode. In the case that the electronic device 100 is in the second usage mode, the display screen 11 of the functional body 10 is controlled to be in a second display mode. The second display mode is adapted for a second interaction mode, which is a multi-person multi-direction interaction mode.

The first supporting mode of the supporting apparatus 20 is corresponding to the first usage mode of the electronic device, and the second supporting mode of the supporting apparatus 20 is corresponding to the second usage mode of the electronic device.

That is, when the electronic device 100 is switched from the first usage mode to the second usage mode, the functional body 10 is switched from being approximately perpendicular to the supporting surface 201 to being approximately parallel to the supporting surface 201, thereby controlling the supporting area of the supporting apparatus 20 to become larger; and when the electronic device 100 is switched from the second usage mode to the first usage mode, the functional body 10 is switched from being approximately parallel to the supporting surface 201 to being approximately perpendicular to the supporting surface 201, thereby controlling the supporting area of the supporting apparatus 20 to become smaller.

Specifically, the supporting area of the supporting apparatus 20 may be adjusted in the following manners.

In a first manner, after the usage mode of the electronic device 100 changes, the relative positions among the multiple supporting legs 41 are adjusted manually, to enable the supporting area of the supporting apparatus 20 to become larger or smaller.

In a second manner, the supporting apparatus 20 is driven using a driving element such as an electric driver. For example, the driver element is started after the usage mode of the electronic device 100 changes, so that the relative positions among the multiple supporting legs 41 change, to enable the supporting area of the supporting apparatus 20 to become larger or smaller.

In a third manner, when the usage mode of the electronic device 100 changes, linkage occurs in the supporting apparatus 20. Specifically, when the functional body 10 changes from the state of being approximately perpendicular to the supporting surface 201 to the state of being approximately parallel to the supporting surface 201, the supporting apparatus 20 is switched from the first supporting mode to the second supporting mode. That is, when the usage mode of the electronic device 100 is switched, the supporting mode of the supporting apparatus 20 is driven to be varied.

When the position of the functional body 10 with respect to the supporting apparatus 20 changes, linkage occurs in the supporting apparatus 20 to cause the supporting area to be varied, so as to avoid from adjusting the supporting apparatus after the state of the functional body changes. Thus, the usage convenience for the user may be improved.

In a fourth manner, specifically with reference to FIG. 6, in the present embodiment, the supporting apparatus 20 further includes a supporting rod 210 connecting the supporting apparatus 20 and the functional body 10, and a base 220, the functional body 10 being rotationally arranged on the supporting rod 210. The supporting rod 210 is used to support the functional body 10 and lift the functional body 10 up or down. In the present embodiment, an accommodation slot is arranged on the supporting apparatus 20. In the case that the functional body 10 is at the lowest position, the supporting rod 210 is contained in the accommodation slot. In addition, in the present embodiment, the supporting rod 210 is a lifting rod. In order to implement electronic control of the supporting rod 210, racks may be arranged on the supporting rod 210, and an electric motor and gears may be arranged on the supporting apparatus 20, wherein the gears can rotate in the case that they are connected to the electric motor and the electric motor is started. The gears are connected to the racks, and in the case that the electric motor rotates in a forward direction or in a reverse direction, the gears rotate to drive the supporting rod 210 to lift up or down.

Figure 7:
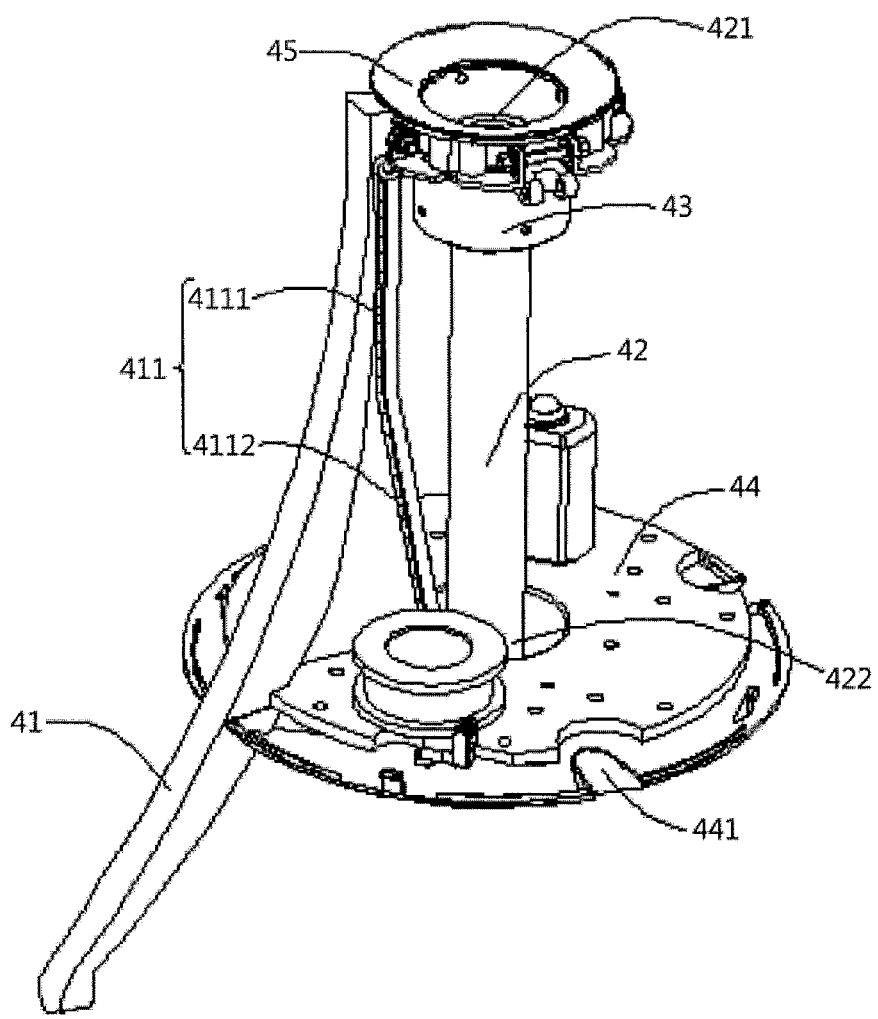
FIG. 7 is a partial enlarged view of the electronic device in FIG. 4.
Figure 8:
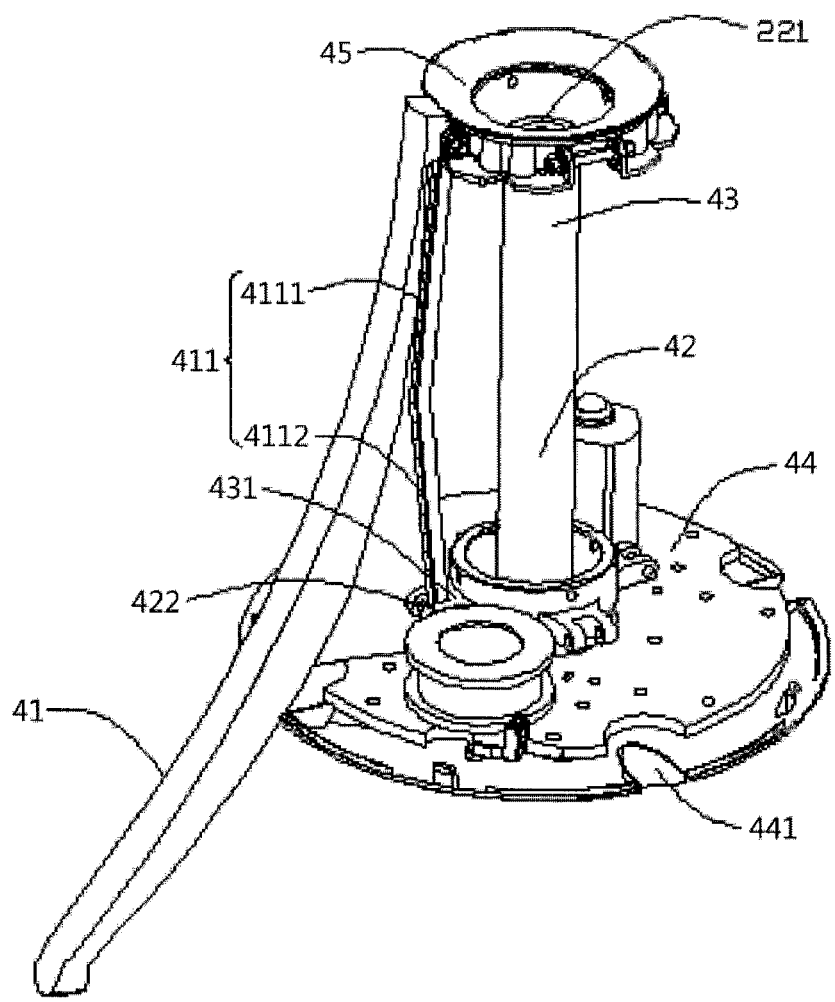
FIG. 8 is another partial enlarged view of the electronic device in FIG. 4.

With respect to FIGS. 7 and 8, the supporting apparatus 20 further includes a supporting pillar 42 and an adjustment member 43. The supporting pillar 42 includes a first end 421 and a second end 422 opposite to the first end 421, the first end 421 being rotationally connected to the functional body 10 and the second end 422 being supported on the supporting surface 201. The adjustment member 43 is arranged on the supporting pillar 42 and is moveable between the first end 421 and the second end 422. The adjustment member 43 has multiple adjustment parts 431 arranged thereon. The number of the adjustment parts 431 corresponds to the number of the supporting legs 41.

The multiple supporting legs 41 are rotationally connected onto the first end 421, and a limiting part 411 is arranged on each of the multiple supporting legs 41. A distance between the limiting part 411 and the supporting pillar 42 is varied in a direction from the first end 421 to the second end 422. The adjustment parts 431 are arranged on the limiting parts 411, and when the adjustment member 43 moves on the supporting pillar 42, the adjustment part 431 moves on the limiting parts 411 to adjust the distance between the supporting leg 41 and the supporting pillar 42.

By arranging, on each supporting leg 41, the limiting part 411 whose distance from the supporting pillar 42 is varied in a direction from the first end part 421 to the second end part 422, and arranging the adjustment part 431 corresponding to the limiting part 411 on the adjustment member 43 which is movable on the supporting pillar 42, the adjustment parts 431 moves on the limiting part 411 when the adjustment member 43 moves on the supporting pillar 42, so as to adjust the distance between the supporting legs 41 and the supporting pillar 42.

In this manner, linkage occurs in the supporting apparatus 20 in the process of the functional body 10 lifting up and down. Specifically, in the case that the distance between the supporting apparatus 20 and the functional body 10 reduces, the supporting apparatus 20 is switched from the first supporting mode to the second supporting mode.

Specifically, in the present embodiment, it may be implemented in the following manner: a connection part is arranged between the supporting rod 210 and the adjustment member 43, and in the case that the supporting rod 210 lifts up or down, the adjustment member 43 is driven to lift up or down, causing the distance between the supporting leg 41 and the supporting pillar 42 to change.

In a fifth manner, when the functional body 10 changes from the state of being approximately perpendicular to the supporting surface 201 to the state of being approximately parallel to the supporting surface 201 and the distance between the supporting apparatus 20 and the functional body 10 reduces, the supporting apparatus 20 is switched from the first supporting mode to the second supporting mode.

It is assumed that in the present embodiment, after the functional body 10 changes from the state of being approximately perpendicular to the supporting surface 201 to the state of being approximately parallel to the supporting surface 201, the functional body 10 starts to lift down; and after the functional body 10 changes from the state of being approximately parallel to the supporting surface 201 to the state of being approximately perpendicular to the supporting surface 201, the functional body 10 starts to lift up.

That is, when the functional body 10 changes from the state of being approximately perpendicular to the supporting surface 201 to the state of being approximately parallel to the supporting surface 201, the supporting apparatus 20 changes from the first supporting mode to the second supporting mode, and when the functional body 10 starts to lift down (i.e., the distance between the functional body 10 and the supporting apparatus 20 reduces), the supporting apparatus 20 continues to change to the second supporting mode, until it changes into the second supporting mode. When the functional body 10 starts to lift up (i.e., the distance between the functional body 10 and the supporting apparatus 20 becomes larger), the supporting apparatus 20 changes from the second supporting mode to the first supporting mode, and when functional body 10 changes from the state of being approximately parallel to the supporting surface 201 to the state of being approximately perpendicular to the supporting surface 201, the supporting apparatus 20 continues to change to the first supporting mode, until it changes into the first supporting mode.

Specifically, the distance between the limiting part and the supporting pillar may be set in the following two manners.

In a first manner, the distance between the limiting part 411 and the supporting pillar 42 gradually reduces in the direction from the first end part 421 to the second end part 422. That is, as long as the adjustment member 43 moves on the supporting pillar 42, the adjustment parts 431 move on the limiting parts 411. As the distance between the limiting part 411 and the supporting pillar 42 changes, the movement of the adjustment parts 431 causes the distances between the multiple supporting legs 41 and the supporting pillar 42 to change, thereby causing the supporting area of the supporting apparatus 20 to be varied.

In a second manner, the limiting part 411 includes a first segment 4111 and a second segment 4112 connected to the first segment 4111. A direction in which the first segment 4111 and the second segment 4112 are arranged is the same as the direction from the first end 421 to the second end 422. A distance between the first segment 4111 and the supporting pillar 42 does not vary in the direction from the first end 421 to the second end 422, and a distance between the second segment 4112 and the supporting pillar 42 gradually reduces in the direction from the first end 421 to the second end 422. That is, in the case that the adjustment member 43 moves on the supporting pillar 42, the adjustment parts 431 move on the first segments 4111 of the limiting parts 411. As the distance between the first segment 4111 and the supporting pillar 42 does not vary in the direction from the first end part 421 to the second end part 422, the movement of the adjustment parts 431 does not cause the distances between the multiple supporting legs 41 and the supporting pillar 42 to change. In the case that the adjustment member 43 continues to move on the supporting pillar 42, the adjustment parts 431 move on the second segments 4112 of the limiting parts 411. As the distance between the second segment 4112 and the supporting pillar 42 gradually reduces in the direction from the first end part 421 to the second end part 422, the movement of the adjustment parts 431 causes the distances between the multiple supporting legs 41 and the supporting pillar 42 to change, thereby causing the supporting surface of the supporting apparatus 20 to be varied.

Further, a scroll wheel contacting with the limiting part 411 is arranged on the adjustment part 431. In the case that the adjustment part 431 moves with respect to the supporting pillar 42, the scroll wheel rolls on the limiting part 411. By arranging the scroll wheel on the adjustment part 431, in the case that the adjustment part 431 moves with respect to the supporting pillar 42, the scroll wheel rolls on the limiting part 411, so as to convert a sliding friction between the adjustment part 431 and the limiting part 411 into a rolling friction, thereby reducing the friction between the adjustment part 431 and the limiting part 411.

The limiting parts 411 may specifically be configured in the following two structures.

Specifically, in a first structure, the limiting parts 411 are particularly limiting slots, and the adjustment parts 431 are arranged in the limiting slots. In the case that the first end of the adjustment member 43 moves on the supporting pillar 42, the adjustment part 431 moves in the limiting slot to adjust the distance between the supporting pillar 42 and the supporting leg 41, thereby causing the supporting area of the supporting apparatus 20 to change. In addition, in the present embodiment, the adjustment member 43 is sleeve-jointed on the supporting pillar 42.

Specifically, in a second structure, the limiting parts 411 are particularly limiting strips, and the adjustment parts 431 are stuck in the limiting strips. In the case that the adjustment member 43 moves on the supporting pillar 42, the adjustment part 431 moves on the limiting strip to adjust the distance between the supporting pillar 42 and the supporting leg 41, thereby causing the supporting area of the supporting apparatus 20 to change.

In addition, the supporting apparatus 20 further includes a chassis 44 fixed on the second end 422 of the supporting pillar 42. Accommodation slots 441 having the same number as that of the supporting legs 41 and being located at positions respectively corresponding to those of the supporting legs 441 are arranged in the chassis 44. The supporting legs 41 can be partly accommodated in the accommodation slots 441. In the case that the electronic device 10 is in the first usage mode, the supporting legs 41 are accommodated in the accommodation slots 441; and in the case that the electronic device 10 is in the second usage state, the distance between the supporting leg 41 and the supporting pillar 42 increases, the supporting legs 41 respectively extend from the accommodation slots 441, and the supporting area of the supporting apparatus 20 increases. By arranging the accommodation slots 441 on the chassis 44, in the case that the electronic device 100 is in the first usage mode, the supporting legs 41 are accommodated in the accommodation slots 441, so as to reduce the area occupied on the supporting area 201 by the supporting apparatus 20; and in the case that the electronic device 100 is in the second usage state, the supporting legs 41 extend from the accommodation slots 441, so as to increase the supporting area of the supporting apparatus 20, thereby improving the stability of the electronic device 100.

In the present embodiment, the supporting apparatus 20 further includes an abutment 45 fixed on the first end 421 of the supporting pillar 42. In the case that the electronic device 100 is in the second usage mode, the functional body 10 contacts with the abutment 45. By arranging the abutment 45 fixed on the first end 421 of the supporting pillar 42, in the case that the electronic device 100 is in the second usage mode, the functional body 10 contacts with the abutment 45, to prevent the functional body 10 from being deflected in the course of use when a certain part of the functional body 10 is subjected to a force, thereby the stability of the electronic device 100 may be improved.

The first supporting area formed in the case that the supporting apparatus 20 in the electronic device 100 for supporting the functional body 10 on the supporting surface 201 is in the first supporting mode is smaller than the second supporting area in the case that the supporting apparatus 20 is in the second supporting mode. Therefore, the supporting area of the supporting apparatus 20 may change in the case of being in different supporting modes, and thus the supporting mode of the supporting apparatus 20 may be adjusted according to the state of the electronic device 100, so that the supporting area of the supporting apparatus 20 changes to stably support the electronic device 100. This solves the technical problem with the conventional solution that due to the smaller supporting area of the base, when the functional body is rotated with the larger angle with respect to the base or is subjected to vibration or an external force, the electronic device is prone to shake or even fall down, thereby being damaged.

The electronic device further includes a moving part. The moving part is arranged on the supporting apparatus 20 and is used to drive the electronic device to move and/or rotate on the supporting surface under an external force. The moving part may be a universal wheel.

Although the above description describes many embodiments of the present disclosure, those skilled in the art can understand that all or a part of the features in these embodiments can be combined randomly and reasonably or changes and modifications can additionally be made to these embodiments without departing from the spirit and scope of the present disclosure.

For example, an electronic device according to another embodiment of the present disclosure may include: a functional body, a supporting apparatus supporting the functional body on a supporting surface and comprising a connected supporting rod and a base; in the case that the electronic device is in a first usage mode, the functional body is approximately perpendicular to the supporting surface; in the case that the electronic device is in a second usage mode, the functional body is approximately parallel to the supporting surface; and in the case that the electronic device is switched between the first usage mode and the second usage mode, a relative position of the supporting rod and the base is unchanged.

A supporting point of the supporting apparatus with respect to the functional body is located at a connecting point between the supporting apparatus and the functional body.

In the case that the supporting apparatus is in a first supporting mode, the supporting apparatus forms a first supporting area; and in the case that the supporting apparatus is in a second supporting mode, the supporting apparatus forms a second supporting area being larger than the first supporting area.

The first supporting mode of the supporting apparatus is corresponding to the first usage mode of the electronic device, and the second supporting mode of the supporting apparatus is corresponding to the second usage mode of the electronic device.

The supporting apparatus comprises multiple supporting legs for supporting the functional body on the supporting surface;

wherein in the case that the supporting apparatus is in the first supporting mode, the first supporting area is enclosed by the multiple supporting legs; and in the case that the supporting apparatus is in the second supporting mode, the second supporting area is enclosed by the multiple supporting legs.

When the functional body changes from a state of being approximately perpendicular to the supporting surface to a state of being approximately parallel to the supporting surface, the supporting apparatus is switched from the first supporting mode to the second supporting mode.

When a distance between the supporting apparatus and the functional body reduces, the supporting apparatus is switched from the first supporting mode to the second supporting mode.

Further, the supporting apparatus comprises: a supporting pillar comprising a first end and a second end opposite to the first end, the first end being rotationally connected to the functional body and the second end being supported on the supporting surface; an adjustment member arranged on the supporting pillar and being moveable between the first end and the second end, the adjustment member having multiple adjustment parts arranged thereon; wherein the multiple supporting legs are rotationally connected on the first end, a limiting part is arranged on each of the multiple supporting legs, and a distance between the limiting part and the supporting pillar varies in a direction from the first end to the second end; and the adjustment part is arranged on the limiting parts, and in the case that the adjustment member moves on the supporting pillar, the adjustment parts moves on the limiting parts to adjust the distance between the supporting leg and the supporting pillar.

The distance between the limiting part and the supporting pillar gradually reduces in the direction from the first end to the second end.

Further, the limiting part comprises a first segment and a second segment connected to the first segment, a direction in which the first segment and the second segment are arranged is the same as the direction from the first end to the second end, a distance between the first segment and the supporting pillar does not vary in the direction from the first end to the second end, and a distance between the second segment and the supporting pillar gradually reduces in the direction from the first end to the second end.

A scroll wheel contacting with the limiting part is arranged on the adjustment part, the scroll wheel rolling on the limiting part in the case that the adjustment part moves with respect to the supporting pillar.

The limiting part is a limiting slot in which the adjustment part is arranged, the adjustment part moving in the limiting slot to adjust the distance between the supporting pillar and the supporting leg in the case that the first end of the adjustment member moves in the supporting pillar.

The limiting part is limiting strips, the adjustment part being stuck on the limiting strips, and moving on the limiting strips to adjust the distance between the supporting pillar and the supporting leg to be varied in the case that the adjustment member moves with respect to the supporting pillar.

Further, the supporting apparatus further comprises a chassis fixed on the second end of the supporting pillar, and accommodation slots having the same number as that of the supporting legs and being located at positions corresponding to those of the supporting legs are arranged in the chassis, the supporting leg being partly accommodated in the accommodation slot.

Further, the supporting apparatus comprises an abutment fixed on the first end of the supporting pillar, the functional body contacting with the abutment in the case that the electronic device is in the second usage mode.

The supporting rod is a lifting rod, the base is sleeve-jointed outside the lifting rod, the lifting rod capable of an up and down lifting motion, and the top of the lifting rod is connected to a central position on the back of the functional body.

A distance by which the lifting rod lifts up is no less than a distance between a connection position and an edge of the functional body.

In the case that the electronic device is in the second usage mode, the lifting rod is contained in the base and an upper surface of the base contacts with a lower surface of the functional body, thereby a contact area being increased so that the support is more stable in the second usage mode.

The top of the lifting rod is connected to the central position on the back of the functional body in a shaft connection.

Further, an elongated slot is arranged on the back of the functional body and is parallel to a width direction of the functional body, and the central position on the back of the functional body is located in the elongated slot, so that in the case that the electronic device is in the first usage mode, the lifting rod is fastened with the elongated slot.

Further, the electronic device further comprises a remote controller placed in the elongated slot and configured to remotely control the functional body and the supporting apparatus.

The remote controller is magnetically connected to the elongated slot.

Further, the electronic device further comprises a keyboard connected to the functional body, by which information is input into the functional body.

Further, the supporting apparatus further comprises a moving part fixedly connected to the supporting apparatus and configured to drive the electronic device to rotate and move on the supporting surface in the case that the electronic device is in either of the first usage mode and the second usage mode.

The moving part is a universal wheel arranged on the bottom of the base and configured to drive the electronic device to move and/or rotate on the supporting surface under an external force.

Further, the electronic device further comprises an adaptive apparatus arranged on the functional body and configured to be used by the electronic device to collect and process external information.

Obviously, those skilled in the art can make various modifications and variations to the present disclosure without departing from the spirit and scope of the present disclosure. Thus, if these modifications and variations of the present disclosure belong to the scope of the claims of the present disclosure and the equivalent technologies thereof, the present disclosure is also intended to include these modifications and variations. The appended claims are intended to be construed as including embodiments and all changes and modifications which fall into the scope of the present disclosure.

What is claimed is:

1. An electronic device, comprising:
a functional body,
a supporting apparatus supporting the functional body on a supporting surface and comprising a supporting rod connected to the functional body and a base;
in the case that the electronic device is in a first usage mode, the functional body is approximately perpendicular to the supporting surface;
in the case that the electronic device is in a second usage mode, the functional body is approximately parallel to the supporting surface; and
when the electronic device is switched between the first usage mode and the second usage mode, a relative position of the supporting rod and the base is unchanged.

2. The electronic device according to claim 1, wherein a supporting point of the supporting apparatus with respect to the functional body is located at a connecting point between the supporting apparatus and the functional body.

3. The electronic device according to claim 1, wherein in the case that the supporting apparatus is in a first supporting mode, the supporting apparatus forms a first supporting area; and
in the case that the supporting apparatus is in a second supporting mode, the supporting apparatus forms a second supporting area being larger than the first supporting area.

4. The electronic device according to claim 3, wherein the first supporting mode of the supporting apparatus is corresponding to the first usage mode of the electronic device, and the second supporting mode of the supporting apparatus is corresponding to the second usage mode of the electronic device.

5. The electronic device according to claim 3, wherein the supporting apparatus comprises multiple supporting legs for supporting the functional body on the supporting surface;
wherein in the case that the supporting apparatus is in the first supporting mode, the first supporting area is enclosed by the multiple supporting legs; and in the case that the supporting apparatus is in the second supporting mode, the second supporting area is enclosed by the multiple supporting legs.

6. The electronic device according to claim 5, wherein when the functional body changes from a state of being approximately perpendicular to the supporting surface to a state of being approximately parallel to the supporting surface, the supporting apparatus is switched from the first supporting mode to the second supporting mode.

7. The electronic device according to claim 5, wherein the supporting apparatus further comprises:
a supporting pillar comprising a first end and a second end opposite to the first end, the first end being rotationally connected to the functional body and the second end being supported on the supporting surface;
an adjustment member arranged on the supporting pillar and being moveable between the first end and the second end, the adjustment member having multiple adjustment parts arranged thereon;
wherein the multiple supporting legs are rotationally connected to the first end, a limiting part is arranged on each of the multiple supporting legs, and a distance between the limiting part and the supporting pillar varies in a direction from the first end to the second end; and
the adjustment part is arranged on the limiting part, and in the case that the adjustment member moves on the supporting pillar, the adjustment part moves on the limiting part to adjust the distance between the supporting leg and the supporting pillar.

8. The electronic device according to claim 7, wherein the distance between the limiting part and the supporting pillar gradually reduces in the direction from the first end to the second end.

9. The electronic device according to claim 7, wherein the limiting part comprises a first segment and a second segment connected to the first segment, a direction in which the first segment and the second segment are arranged is does not vary in the direction from the first end to the second end, a distance between the first segment and the supporting pillar is the same in the direction from the first end to the second end, and a distance between the second segment and the supporting pillar gradually reduces in the direction from the first end to the second end.

10. The electronic device according to claim 7, wherein a scroll wheel contacting with the limiting part is arranged on the adjustment part, the scroll wheel rolling on the limiting part in the case that the adjustment part moves with respect to the supporting pillar.

11. The electronic device according to claim 7, wherein the limiting part is a limiting slot in which the adjustment part is arranged, the adjustment part moving in the limiting slot to adjust the distance between the supporting pillar and the supporting leg in the case that the first end of the adjustment member moves in the supporting pillar.

12. The electronic device according to claim 7, wherein the limiting part is limiting strips, the adjustment part being stuck on the limiting strips, and moving on the limiting strips to adjust the distance between the supporting pillar and the supporting leg to be varied in the case that the adjustment member moves with respect to the supporting pillar.

13. The electronic device according to claim 7, wherein the supporting apparatus further comprises a chassis fixed on the second end of the supporting pillar, and accommodation slots having the same number as that of the supporting legs and being located at positions corresponding to those of the supporting legs are arranged in the chassis, the supporting legs being partly accommodated in the accommodation slot.

14. The electronic device according to claim 7, wherein the supporting apparatus further comprises an abutment fixed on the first end of the supporting pillar, the functional body contacting with the abutment in the case that the electronic device is in the second usage mode.

15. The electronic device according to claim 14, wherein the supporting rod is a lifting rod, the base is sleeve-jointed outside the lifting rod, the lifting rod capable of an up and down lifting motion, and the top of the lifting rod is connected to a central position on the back of the functional body.

16. The electronic device according to claim 15, wherein a distance by which the lifting rod lifts up is no less than a distance between a connection position and an edge of the functional body.

17. The electronic device according to claim 16, wherein in the case that the electronic device is in the second usage mode, the lifting rod is contained in the base and an upper surface of the base contacts with a lower surface of the functional body, thereby a contact area being increased so that the support is more stable in the second usage mode.

18. The electronic device according to claim 15, wherein the top of the lifting rod is connected to the central position on the back of the functional body in a shaft connection.

19. The electronic device according to claim 15, wherein an elongated slot is arranged on the back of the functional body and is parallel to a width direction of the functional body, and the central position on the back of the functional body is located in the elongated slot, so that in the case that the electronic device is in the first usage mode, the lifting rod is fastened with the elongated slot.

20. The electronic device according to claim 19, further comprising a remote controller placed in the elongated slot and configured to remotely control the functional body and the supporting apparatus.

21. The electronic device according to claim 20, wherein the remote controller is magnetically connected to the elongated slot.

22. The electronic device according to claim 3, wherein when a distance between the supporting apparatus and the functional body reduces, the supporting apparatus is switched from the first supporting mode to the second supporting mode.

23. The electronic device according to claim 1, further comprising a keyboard connected to the functional body, by which information is input into the functional body.

24. The electronic device according to claim 1, wherein the supporting apparatus further comprises a moving part fixedly connected to the supporting apparatus and configured to drive the electronic device to rotate and move on the supporting surface in the case that the electronic device is in either of the first usage mode and the second usage mode.

25. The electronic device according to claim 24, wherein the moving part is a universal wheel arranged on the bottom of the base and configured to drive the electronic device to move and/or rotate on the supporting surface under an external force.

26. The electronic device according to claim 1, further comprising an adaptive apparatus arranged on the functional body and configured to be used by the electronic device to collect and process external information.

* * * * *